6145X
No Printed Specification Av
R. McCORMICK.
Hemp Brake.
Patented Oct. 1, 1830.
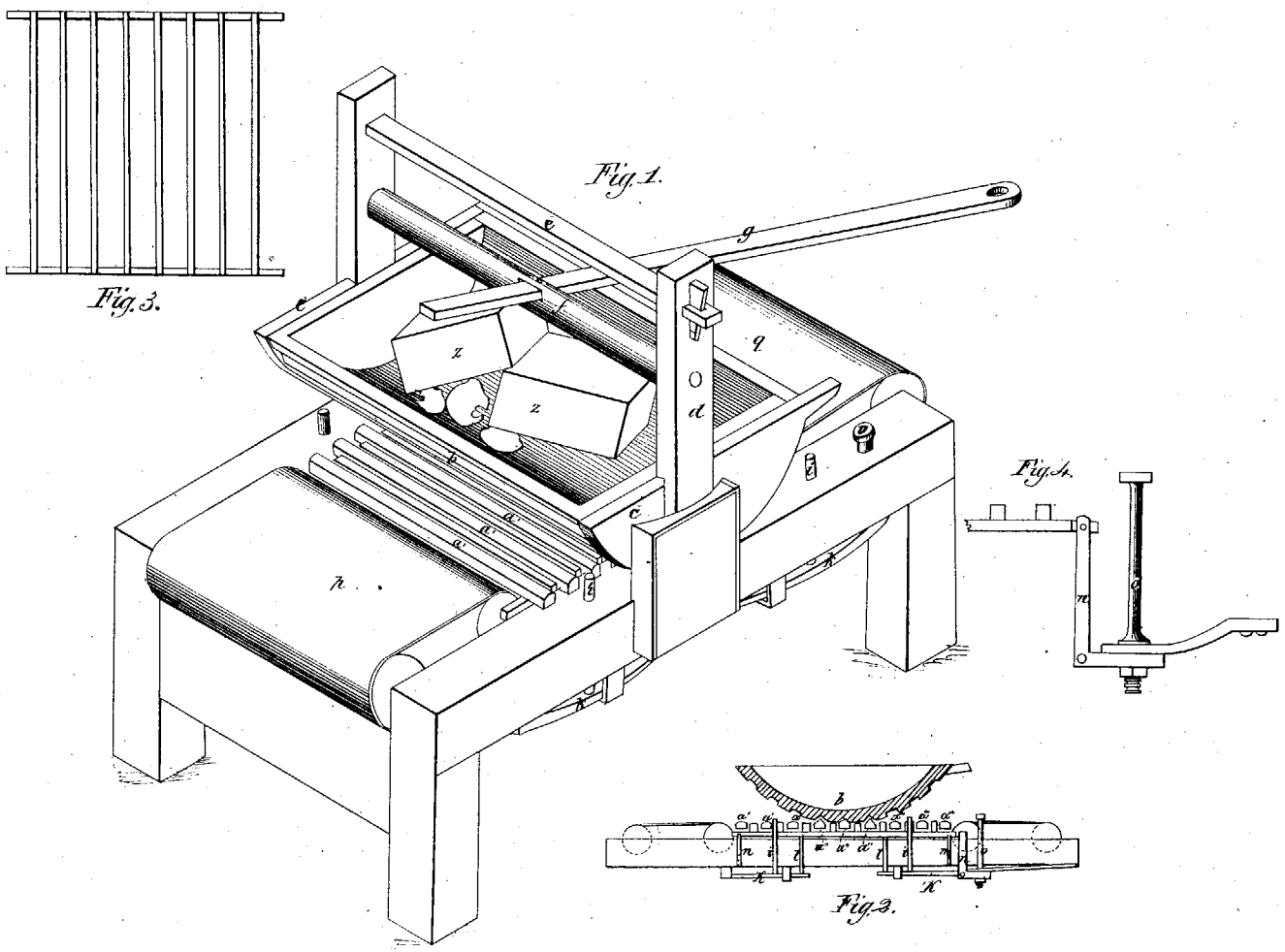
N. PETERS, Photo-Lithographer, Washington, D. C.

Oct. 1. 1830 6145x

Robert McCormick
Letters Patent — Dated October 1. 1830.

The Schedule referred to in these Letters Patent and making part of the same containing a description in the words of the said Robert McCormick himself of his improvement in the Machine for breaking hemp & flax.

---

Be it known that I Robert McCormick of Rockbridge County State of Virginia have made an improvement in the Machine for breaking hemp & flax which is described as follows. This machine consists of the following principle parts 1st The Frame 2nd The bed of bars. 3d The fluted rocker. 4th the upright posts & top piece. 5th The vibrating bar. 6th The cant frame & levers of the Feeding & delivering aprons 1st The Frame is about 2½ or 3 feet high about 8 feet long & 6 feet wide & of sufficient strength to support the machinery to be hereafter described. 2nd The Bed of bars. This bed of bars consists of about 9 (more or less) the tops of the 3 in front are made with obtuse plane angles the next 3 are at an acute angle at top & angular at the shoulders, the 3 next are flat at top about 3/8 of an inch with angles at the shoulders, they are disposed in such a way as that when the hemp &c first enters it is slightly crushed; the second set break it still further & the 3d set complete the operation of breaking. They are made of cast iron 1¾ inch thick & placed apart at about 2¼ inches across the frame. They may also be made of wood in the same manner but proportionally strong. 3d The Fluted Rocker is made of cast iron is cast whole being a segment of a circle of about 3½ feet radius, the flutes are made to correspond with the bed of bars before described. It is [illegible] to two rockers made of wood one on each side & the sides are connected by a frame. The ends of the rockers extend beyond the bed of bars about 7 or 8 inches. The upright posts & top piece There are two upright posts about 4 feet high & framed into the rockers one on each side. A top piece connects these posts by being mortised & tenoned into them 5th The vibrating bar is made of wood,

6145X

& extends between the posts across the frame it turns [illegible] on gudgeons in
the upright posts & it has a hole mortised in its middle to admit a bar
6th. The cant Frame & levers. The cant frame consists of thin bars
wood one between each two of the bed bars connected together by a piece
of wood at each end of the bars. In the frame where the points of the
rockers strike are loose pins one at each corner which are pressed down
by the motion of the rocker & are attached to the springs below the frame
These springs act over fulcrums & press up the cant frame by means of
other pins near the centre; The cant Frame is prevented from rising
too high by means of straps connected with it & the main frame.
There are two bent levers one on each side from which the cant frame
receives its motion backwards & forwards. These levers are attached to
springs thro' which two long screws extend down thro' the frame. The tops
of which screws are operated on by a projection attached to the rocker
7th. The feeding & delivering aprons. These are made similar to those
used in threshing machines & receive their motion from a cog wheel op-
erated on by the levers which work the cant frame. Operation. The hemp
being first properly prepared is laid upon the feeding cloth. a suf-
ficient weight is attached to the top & upon the upper part of the flut-
ed rocker. a bar or driver is put thro' the vibrating bar one end of which
may be attached to any machinery that will give it a vibratory
motion. Motion being given to the machine the hemp is crushed between
the fluted rocker & bed of bars. the cant frame & levers being operated on
by the rocker carry forward the hemp about 2 inches at each vibration
till it is completely broken & delivered upon the hinder apron.
The rocker is kept in its place by blocks of wood grooved out to receive
sides of the rocking frame. What is here claimed as my invention
is the whole of the before described Machine for breaking hemp & flax
For a further illustration of my invention I refer to the model & draw
ing of the same deposited in the Patent Office. In testimony that
the foregoing is a true description of my invention I have subscribed
my name before two witnesses at the City of Washington this 27th day
of July 1830, Witnesses William P. Elliot
Cyrus H. McCormick Robert McCormick